(12) United States Patent
Danninger

(10) Patent No.: US 9,311,400 B2
(45) Date of Patent: Apr. 12, 2016

(54) METHOD AND SYSTEM FOR PROVIDING TIME-DEPENDENT SEARCH RESULTS FOR REPETITIVELY PERFORMED SEARCHES

(75) Inventor: Michael Danninger, Landau (DE)

(73) Assignee: SAP SE, Walldorf (DE)

( * ) Notice: Subject to any disclaimer, the term of this patent is extended or adjusted under 35 U.S.C. 154(b) by 2869 days.

(21) Appl. No.: 11/280,077

(22) Filed: Nov. 15, 2005

(65) Prior Publication Data

US 2007/0112817 A1    May 17, 2007

(51) Int. Cl.
*G06F 17/30* (2006.01)

(52) U.S. Cl.
CPC .... *G06F 17/30864* (2013.01); *G06F 17/30867* (2013.01)

(58) Field of Classification Search
None
See application file for complete search history.

(56) References Cited

U.S. PATENT DOCUMENTS

| 6,292,796 | B1 * | 9/2001 | Drucker et al. |
| 6,487,553 | B1 * | 11/2002 | Emens et al. |
| 2002/0013825 | A1 * | 1/2002 | Freivald et al. ............... 709/218 |
| 2003/0055816 | A1 * | 3/2003 | Paine et al. ....................... 707/3 |
| 2005/0198068 | A1 * | 9/2005 | Mukherjee et al. ........ 707/104.1 |

OTHER PUBLICATIONS

Yahoo feature of search with ability to set time parameters for when webpage was last updated. http://search.yahoo.com/web/advanced?ei=UTF-8. Visited on Feb. 8, 2008.

* cited by examiner

*Primary Examiner* — Jason Liao
(74) *Attorney, Agent, or Firm* — Kenyon & Kenyon LLP

(57) ABSTRACT

A software tool allows a computer user to view only search results that have become available since he last performed the same search. A user enters a search term by way of an input/output device, and the CPU performs the requested search. The computer system identifies and displays only the new results. The user can toggle this feature on and off.

9 Claims, 8 Drawing Sheets

METHOD AND SYSTEM FOR PROVIDING TIME-DEPENDENT SEARCH RESULTS FOR REPETITIVELY PERFORMED SEARCHES

BACKGROUND

The present invention is a tool for allowing a user to retrieve from any searchable resource only new search results for a specific search term. Specifically, when a user performs the same search multiple times, the present invention displays for each performed search only those search results that were not displayed for the preceding performance of the same search.

Modern search engines, especially those that search the Internet, present users with a vast number of search results for each search term inputted. When a user searches for the same term over and over again using current search engines, each set of search results will contain not only those search results that were created or otherwise became available since the last time that term was searched, but also the search results that were already obtained by a prior performance of the same search. It would be useful to provide to the user only those search results that were not previously provided by prior searches of the same search term. Such a search engine would eliminate the waste of time by the user sifting through all the search results each time the same search is performed to determine the new results, especially since the user may not even remember which search results were retrieved the last time the search was executed. Therefore, in addition to being time-consuming, reading through all the results may not even allow the user to accurately determine which results are indeed new.

DETAILED DESCRIPTION

Embodiments of the present invention work cooperatively with existing search applications to narrow search results according to the search activity of a specific user. When a user enters a search term in a search engine, the CPU performs the search in the appropriate resource. The search resource may, for example, be a database accessible via an intranet or it may be the Internet itself. The CPU then accesses the user's profile in a user profile memory. A user profile is uniquely associated with an individual user (through, for example, a unique identifier used to verify an identity entered by the user in a log-in procedure) and is capable of storing a record for each different search entered by the user and performed by the system. Each search record is associated with a different search that has been performed at least once by the user. Each search record can be identified by the search term(s) of the search with which it is associated. For instance, search record A may be for the search request "Disney World Hotels," and it may be uniquely identified by these search terms. Such a search record would contain information useful in providing, the next time this same search is performed, only the results that were not found the last time it was performed. If the user is not recognized because he has never before submitted a search request, a new user profile is created. Alternatively, if the CPU recognizes that the user has a profile, but does not match the search terms of a new search entered by the user to any previously stored search records, his user profile is updated by creating a new search record, and the search results are displayed. If the user has performed the same search before, the CPU accesses the search record for that search in order to determine the new results, and displays only the new results which were not retrieved in the previous search. Then, the search record for that search is updated with the latest search information. A search result may be regarded as "new" if it was created or became accessible only after the last time the search was performed. For instance, if search A yields results 1-4 from the Internet the first time it was performed, and yields search results 1-6 the second time it was performed, search results 5 and 6 may correspond to web pages that had not been created the first time search A was performed. Search results 5 and 6 are new search results, and the second performance of search A would result in the display of only search results 5 and 6. The new results may be organized as a presentation set of search results, meaning that the members of this set are the ones that are presented to the user.

Figure 1:
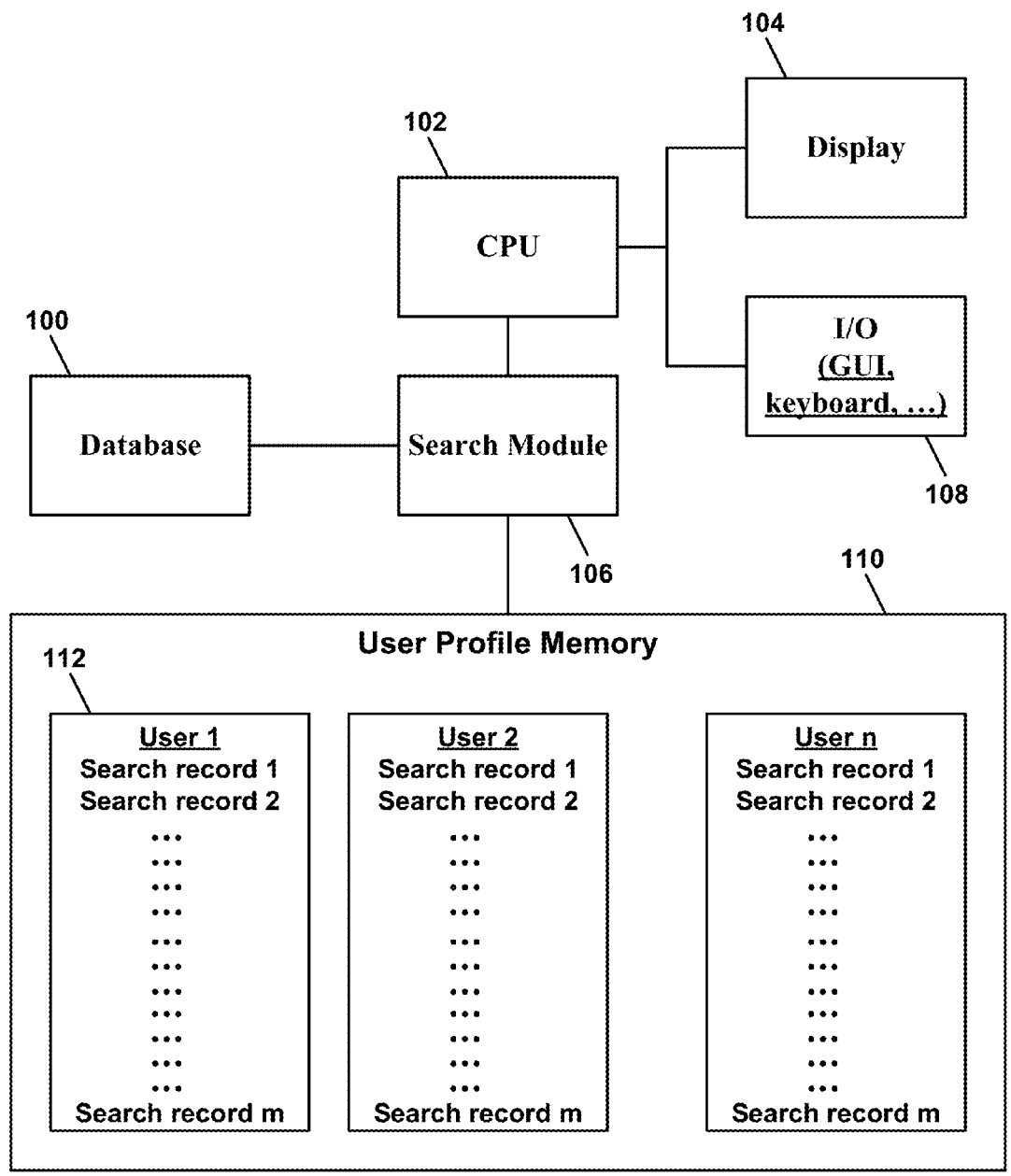
FIG. 1 is a simplified block diagram of a computer system according to an embodiment of the present invention.

FIG. 1 is a simplified block diagram of an exemplary computer system suitable for use with the present invention. A user first enters a password in a log-in transaction. Alternatively, the user may be uniquely identified through a unique identifier associated with his computer (e.g., a serial number). The user then inputs a search term by way of an input/output device 108, such as a keyboard or a mouse, for example. The CPU 102 receives the input and passes it onto the search module 106, which includes a search function and a comparison tool. The search module 106 then searches the database 100, thereby generating a set of search results. Thereafter, the search module 106 accesses the user profile memory 110. This access involves reading the user profile of the current user; this profile may be accessed, for example, by matching the password entered by the user to the unique identifier of the user's profile. Once the user's profile is accessed, the system determines whether the current search has already been performed by this user by determining whether a search record has already been created for the current search. Since each search record may be identified by the search term(s) of the search with which the record is associated, this determination may be performed by comparing the search term(s) of the current search with each search record's associated search term(s).

Once the search record corresponding to the current search has been accessed, the system determines which search results of the current search are not in the list of previous results for this search as stored in the accessed search record. The search results that are absent from the search record are the search results that were created or became otherwise available only after the last time the search was performed. For instance, a user causes a search to be performed based on the search terms "automobile" and "fuel." The first time this search is performed, search results A through D are produced. If the search was performed on the Internet, each of the search results may be identified by a URL. These URLs are kept in the search record identified by the search terms "automobile" and "fuel." When the user performs the same search again, the search may produce search results A through G. What this indicates is that in the time between the first and second performances of the search, new search results E through G came online. By comparing the current search results A though G with the old search results A though D, the system is able to isolate new search results E through G and display only these for the user. In this way, the system spares the user the difficulty of having to visually sift through all search results A through G and attempt recalling which are new and which were displayed the previous time he performed this search. The system also updates the search record by appending to results A through D the URLs for results E through G. Although this example relies on URLs as the basis for identifying search results in a search record, any pointer or other data structure capable of uniquely identifying searchable items may be used.

Note that the search module 106, database 100, and user profile memory 110 need not reside inside a single computer, but may instead be embodied as remotely located resources dispersed throughout a network such as the Internet or a corporate intranet.

The user profile memory 110 consists of individual user profiles 112 for each user. Each user profile is associated with and identified by a unique identifier, such as a log-in password, for example. Each user profile 112, in turn, contains a search record for each search performed by that user. Each search record is identified by the search terms of its associated search. For instance, if search record 1 is associated with a search based on the terms "ancient" and "Rome," then search record 1 would be identified by those terms. Each search record would contain information (e.g., search result URLS) useful in separating search results never before presented to the user from search results that were already presented to the user. The search records within the user profiles 112 are organized according to the illustrations in FIGS. 2-4.

Figure 2:
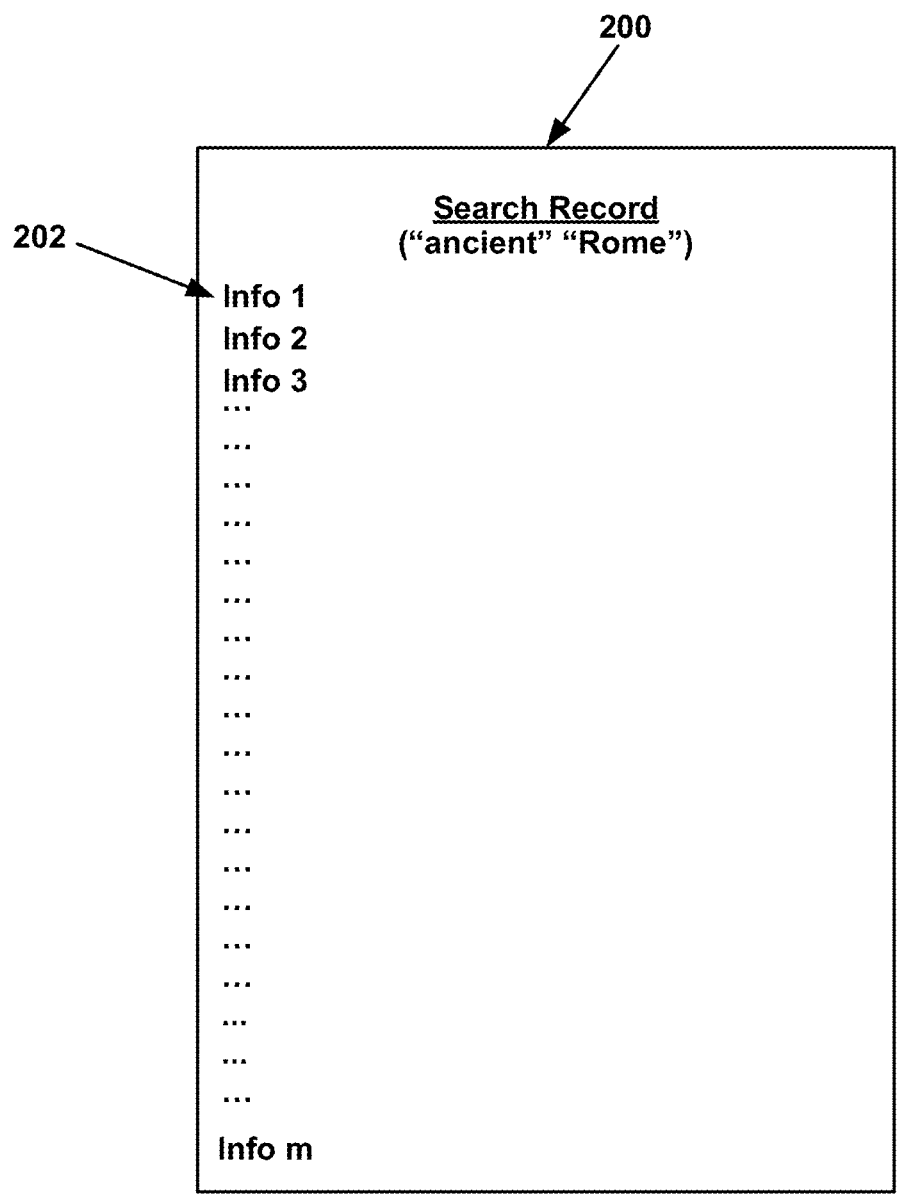
FIG. 2 is a diagram of one user profile search record saved in memory, as referenced in FIG. 1.

FIG. 2 illustrates a search record 200 of a user profile 112, which is contained in the user profile memory 110 referenced in FIG. 1. Search record 200 is associated with the search based on terms "ancient" and "Rome." Search record 200 stores information identifying all the search results that were obtained by all the times this search was performed by the user whose profile 112 contains record 200. In one embodiment of the present invention, the full results of each search are stored and used for comparison against future searches. In FIG. 2, the list 202 corresponds to the full content of each search result that the search returned, including objects and/or text.

Figure 3:
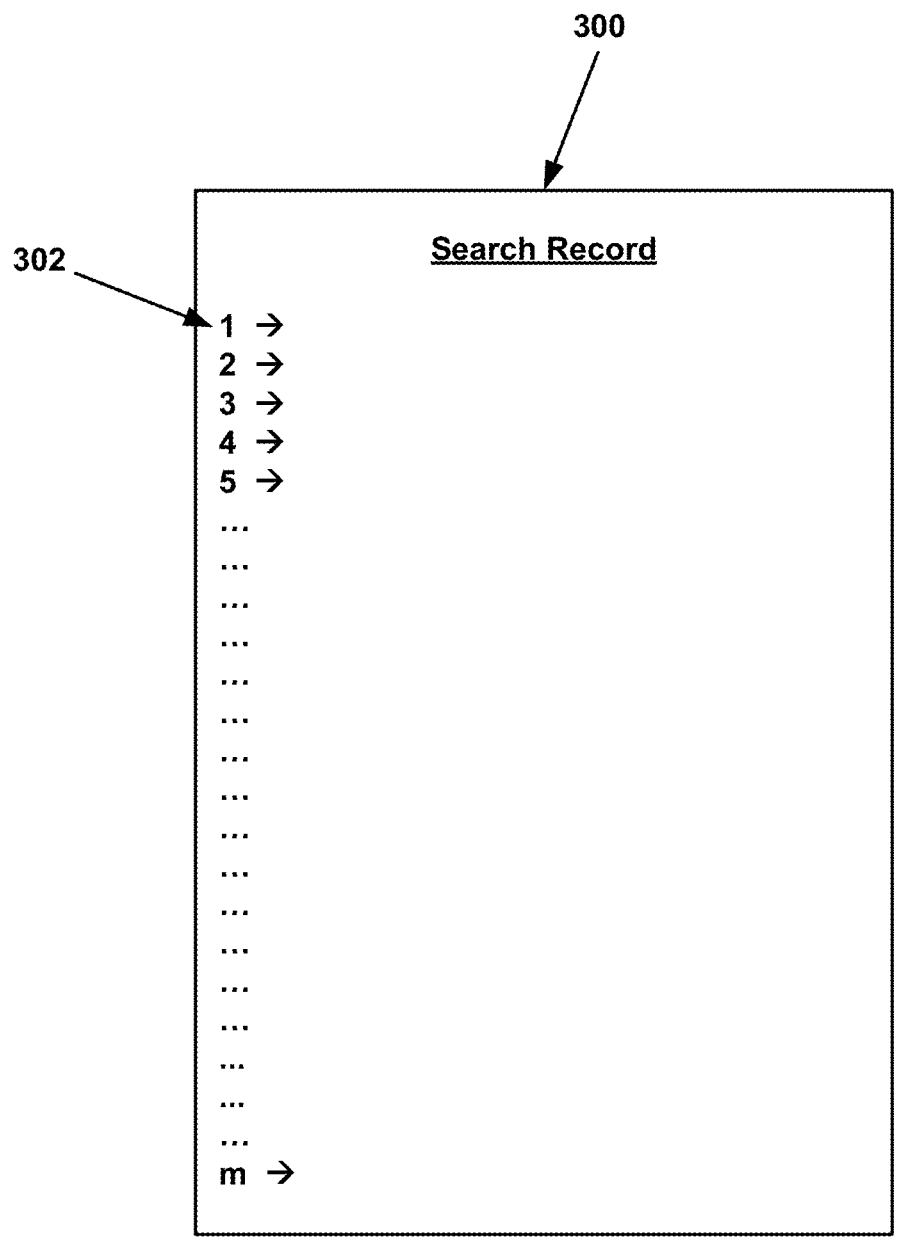
FIG. 3 is a diagram of an alternative embodiment of one user profile search record saved in memory, as referenced in FIG. 1.

FIG. 3 illustrates an alternative embodiment for a search record 300 in a user profile 112, which is contained in the user profile memory referenced in FIG. 1. For each search result, a pointer 302 is stored, such as a URL address, which references its place in the database 100.

Figure 4:
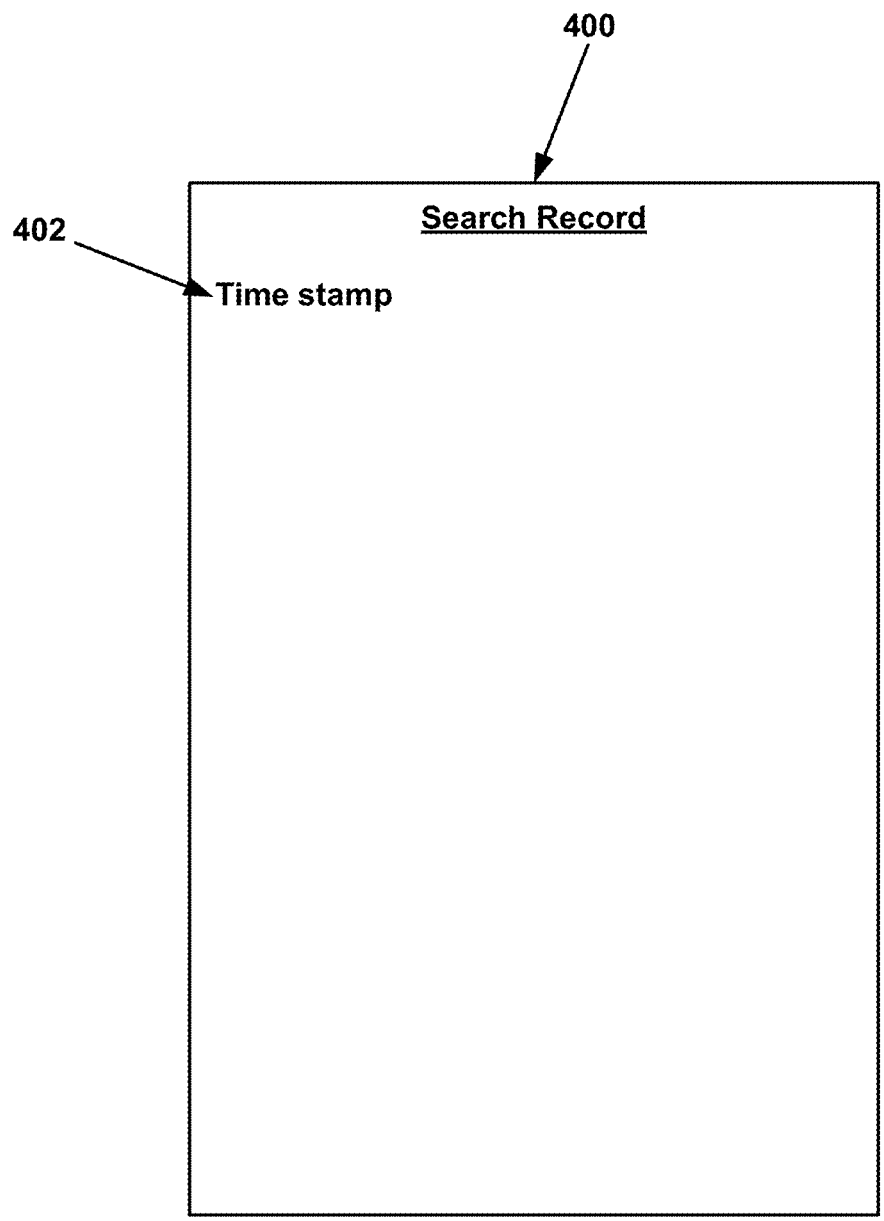
FIG. 4 is a diagram of another embodiment of one user profile search record saved in memory, as referenced in FIG. 1.

FIG. 4 illustrates another embodiment for a search record 400 in a user profile 112, which is contained in the user profile memory 110 referenced in FIG. 1. This embodiment would be appropriate for searches performed within a computer network environment. Instead of storing information indicative of actual search results, search record 400 stores a timestamp 402 indicating the last time the search was performed. Whenever an object is stored in the database 100, i.e., saved in the computer network, a timestamp is automatically associated with it. Then, when the user performs a search for only new results, the search tool of search module 106 scans the timestamps of all matching search results and compares them with the timestamp stored in search record 400 for the given search term. The CPU 102 then displays to the user only the search results associated with timestamps having a later date and time than that of the timestamp stored in memory. After displaying the new results, the timestamp in record 400 then is updated to reflect the latest performance of its associated search.

One consequence of organizing search records within user-specific search profiles is that two users who perform the identical search would produce different search results, provided that the users performed the same search at different times.

Figure 5:
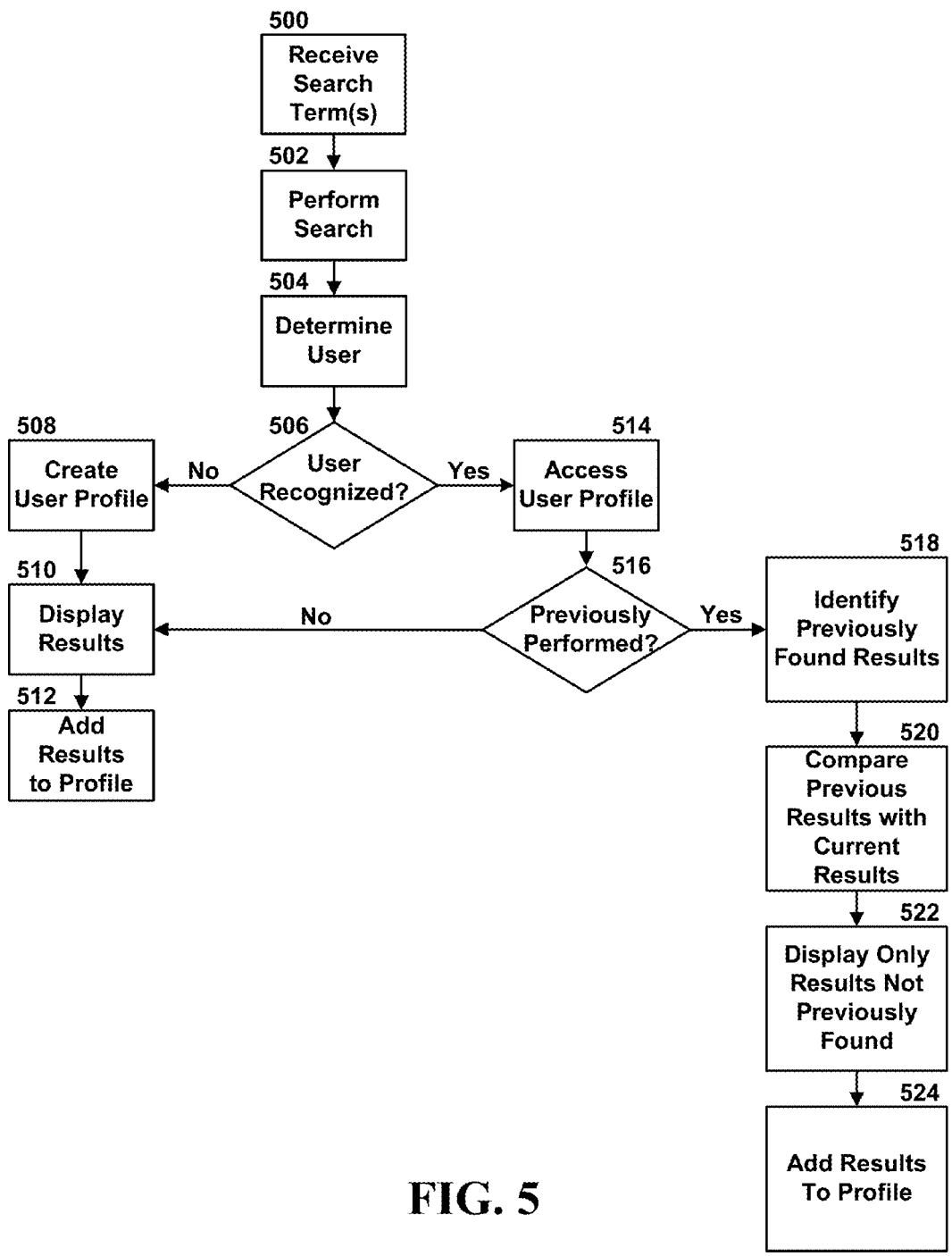
FIG. 5 is a dataflow diagram illustrating the operation of one embodiment of the present invention.

FIG. 5 is a dataflow diagram of one embodiment of the present invention which operates in conjunction with the search records in FIGS. 2-3. The method begins when a user enters a search term by way of an input/output device, step 500. The CPU then performs the requested search, step 502. Thereafter, the CPU determines who the user is, step 504. The user determination step 504 may also be done at other times in this method, for example, in the beginning. The CPU then determines whether or not it recognizes the user, step 506. This may be accomplished by a log-in transaction, although other techniques for identifying users may be used. If the CPU does not recognize the user, it creates a new user profile (through, e.g., any suitable user registration transaction), step 508, displays the results of the search, step 510, and adds the results of the search to the user profile, step 512. The search results are kept within the user profile in a search record for that search. If the CPU does recognize the user, it accesses his user profile, step 514, and determines whether the present search has been previously performed by this user, step 516. If this user has not previously performed the current search, the results are displayed, step 510, and stored in a new search record that is added to the user profile, step 512. If the search has been performed previously by the present user, as determined by the presence of an associated search record in user profile memory 110, the CPU 102 accesses the previously found results, step 518, and compares them with the current results, step 520. This is determined by checking the search terms associated with each search record. In the case when the user enters "ancient" and "Rome" as his search, the system checks whether any search record in his own profile is associated identically with these terms. If so, it accesses the search results identified in the search record, compares them to the results of the current search, and determines, based on the comparison, which of the current search results are not in the search record. Then, the CPU displays only the new results which were not previously stored in the "ancient Rome" search record of the user profile, step 522, and updates this search record by storing the information identifying the results of the present search, step 524.

Figure 6:
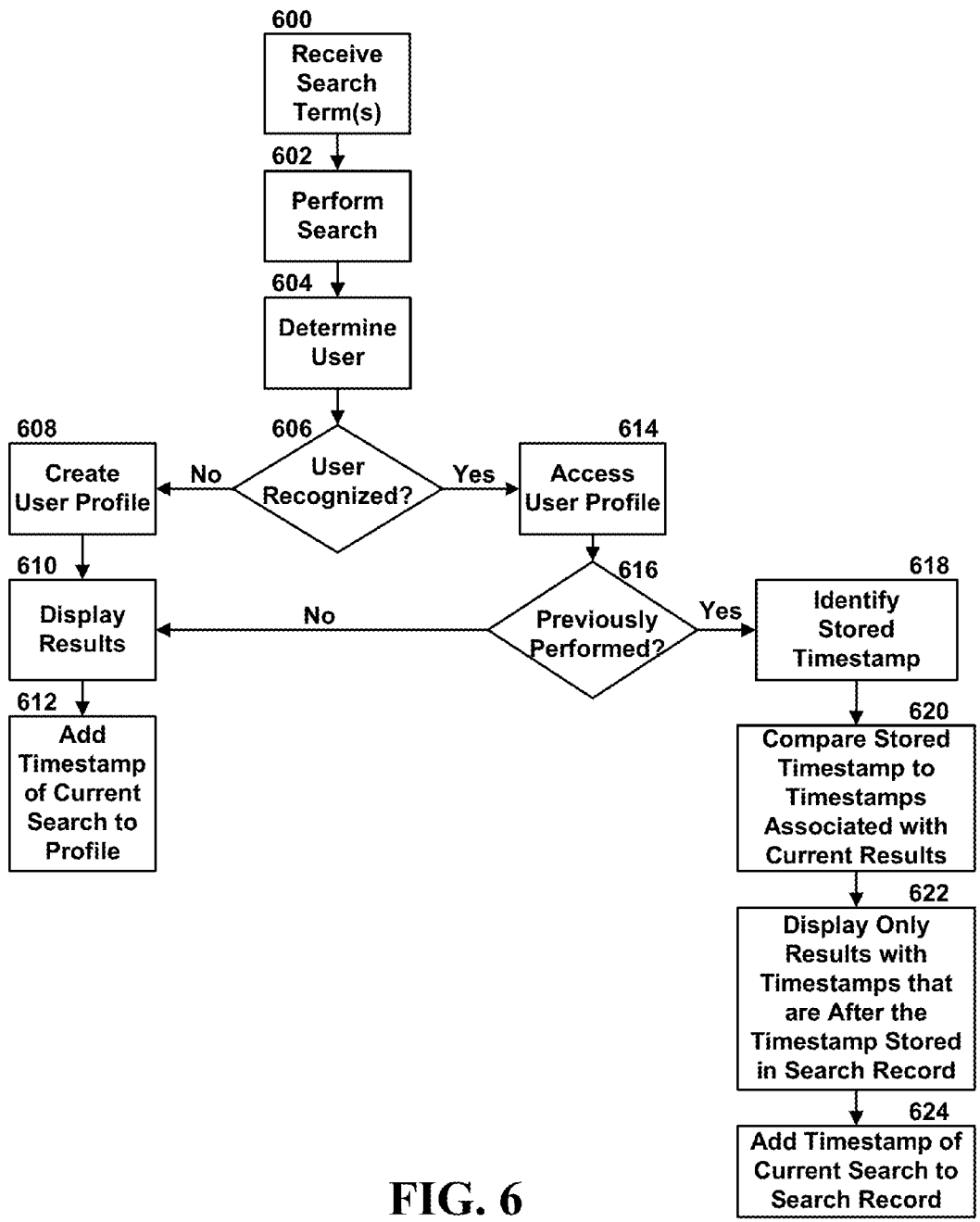
FIG. 6 is a dataflow diagram illustrating the operation of another embodiment of the present invention.

FIG. 6 is a dataflow diagram of an alternative embodiment of the present invention, which operates in conjunction with the search record referenced in FIG. 4. This embodiment is appropriate for searches involving a searchable resource in which the search objects (documents, multimedia, etc.) stored therein are time-stamped. This method proceeds in the same way as the one in FIG. 5, except in the steps 618, 620, 622, 624. Rather than compare the search results of the current search to the previously stored search results, the timestamps of the search results for the current search are compared to the stored timestamp for that search, step 620. The CPU displays as new results only those having timestamps that chronologically follow the timestamp in the search record for the current search, step 622. Finally, the timestamp of the present search is stored in the user profile, step 624.

Figure 7:
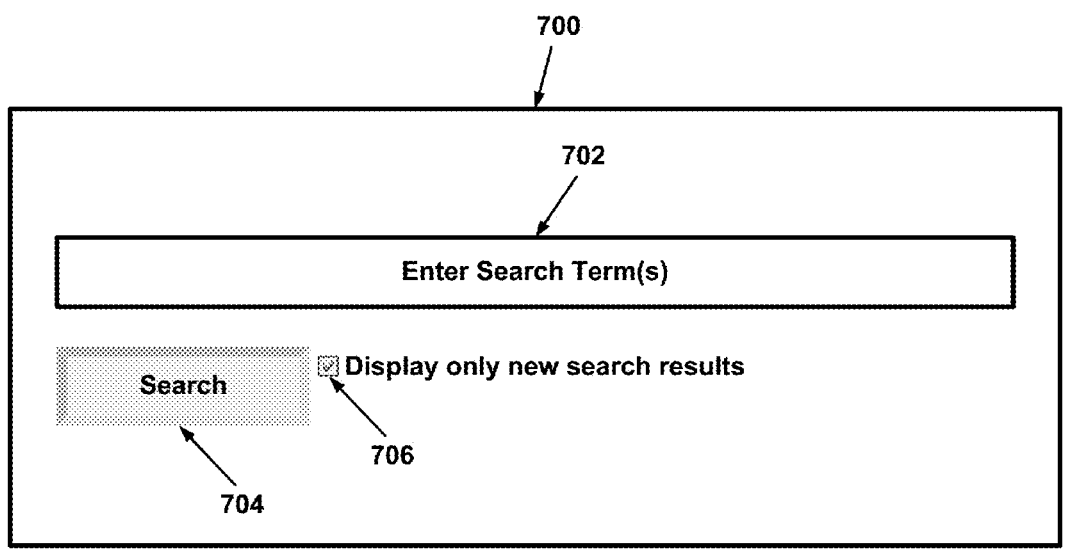
FIGS. 7-8 are screen shots illustrating the operation of embodiments of the present invention.

FIG. 7 depicts a graphical user interface of a search engine 700 incorporating the present invention. Next to a generic search button 704, there is a check box 706 entitled "Display only new results." FIG. 7 illustrates an embodiment of the invention where the default setting of the check box is set to "on." When the user clicks on the check box, a check disappears from the box and the feature is disabled. To conduct a search, the user enters a term in the text window 702, checks or unchecks the "Display only new results" box 706, and clicks on the search button 704.

Figure 8:
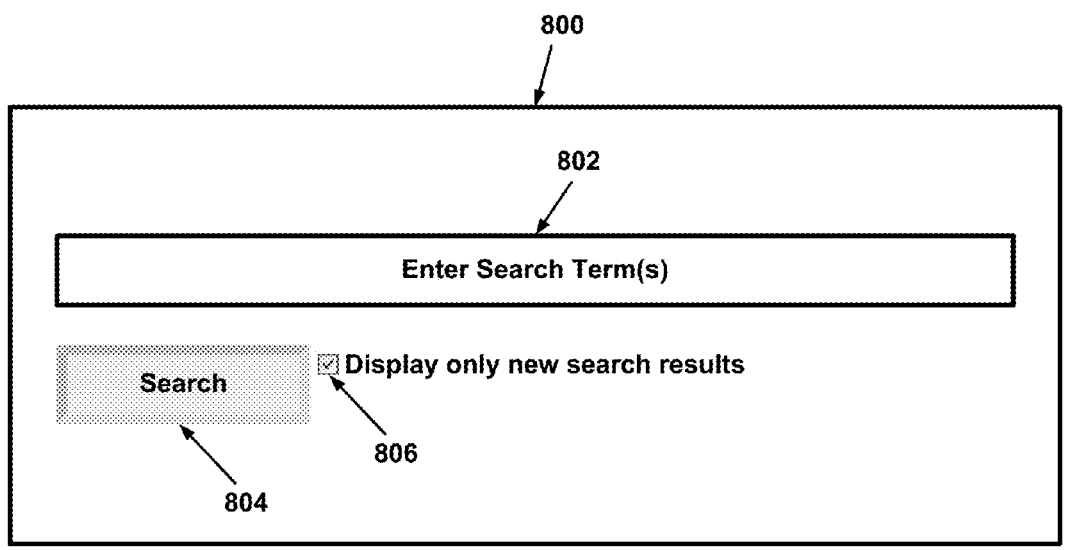

FIG. 8 is a graphical user interface of a search engine 800 incorporating the present invention. Next to a generic search button, there is a check box entitled "Display only new results." FIG. 8 illustrates an embodiment of the invention where the default setting of the check box is set to "off." When the user clicks on the check box, a check appears in the box and the feature is enabled. To conduct a search, the user enters a term in the text window 802, checks or unchecks the "Display only new results" box 806, and clicks on the search button 804.

What is claimed is:

1. A computer-implemented method of filtering a current set of search results comprising URLs from a search engine obtained by performing an interactive search based on at least one search term, comprising:
    for each URL in the current set of search results,
        if the URL is in a search record indexed by the at least one search term and a user who initiated the search, then fetching the webpage and objects associated with the webpage corresponding to the URL,
            comparing the fetched webpage and objects with a stored webpage and objects indexed by the URL and the user, and
                if the fetched webpage and objects are different from the stored webpage and objects indexed by the URL, then including the URL in a final set of search results,
                otherwise not including the URL in the final set of search results;
        otherwise, including the URL in the final set of search results;
    presenting the final set of search results to the user; and
    when a user selects a URL from the final set of search results, fetching the webpage and objects associated with the URL and storing the fetched webpage and objects indexed by the user and the at least one search term for a subsequent iteration of the method.

2. The computer-implemented method of claim 1, wherein the objects include at least one image.

3. The computer-implemented method of claim 1, further including the steps of:
    presenting a text box configured to receive user input; and
    presenting a selectable display element for activating or deactivating the method of filtering.

4. A non-transitory computer readable medium storing instructions adapted to be executed by a processor, the instructions, when executed, resulting in a method being performed for filtering a current set of search results comprising URLs from an interactive search engine obtained by performing a search based on at least one search term, comprising:
    for each URL in the current set of search results,
        if the URL is in a search record indexed by the at least one search term and a user who initiated the search, then fetching the webpage and objects associated with the webpage corresponding to the URL,
            comparing the fetched webpage and objects with a stored webpage and objects indexed by the URL and the user, and
                if the fetched webpage and objects are different from the stored webpage and objects indexed by the URL, then including the URL in a final set of search results,
                otherwise not including the URL in the final set of search results;
        otherwise, including the URL in the final set of search results;
    presenting the final set of search results to the user; and
    when a user selects a URL from the final set of search results, fetching the webpage and objects associated with the URL and storing the fetched webpage and objects indexed by the user and the at least one search term for a subsequent iteration of the method.

5. The non-transitory computer readable medium of claim 4, wherein the objects include at least one image.

6. The non-transitory computer readable medium of claim 4, further including the steps of:
    presenting a text box configured to receive user input; and
    presenting a selectable display element for activating or deactivating the method of filtering.

7. A computer system for filtering a current set of search results comprising URLs from a search engine obtained by performing an interactive search based on at least one search term, comprising:
    an arrangement for, each URL in the current set of search results,
        if the URL is in a search record indexed by the at least one search term and a user who initiated the search, then fetching the webpage and objects associated with the webpage corresponding to the URL,
            comparing the fetched webpage and objects with a stored webpage and objects indexed by the URL and the user, and
                if the fetched webpage and objects are different from the stored webpage and objects indexed by the URL, then including the URL in a final set of search results,
                otherwise not including the URL in the final set of search results;
        otherwise, including the URL in the final set of search results;
    an arrangement for presenting the final set of search results to the user; and
    an arrangement for when a user selects a URL from the final set of search results,
        fetching the webpage and objects associated with the URL and storing the fetched webpage and objects indexed by the user and the at least one search term for a subsequent iteration of the method.

8. The computer system of claim 7, wherein the objects include at least one image.

9. The computer system of claim 7, further including the steps of:
    presenting a text box configured to receive user input; and
    presenting a selectable display element for activating or deactivating the method of filtering.

* * * * *